No. 858,979. PATENTED JULY 2, 1907.
S. E. HAMMAR.
OPTICAL INSTRUMENT.
APPLICATION FILED APR. 25, 1907.
2 SHEETS—SHEET 1.
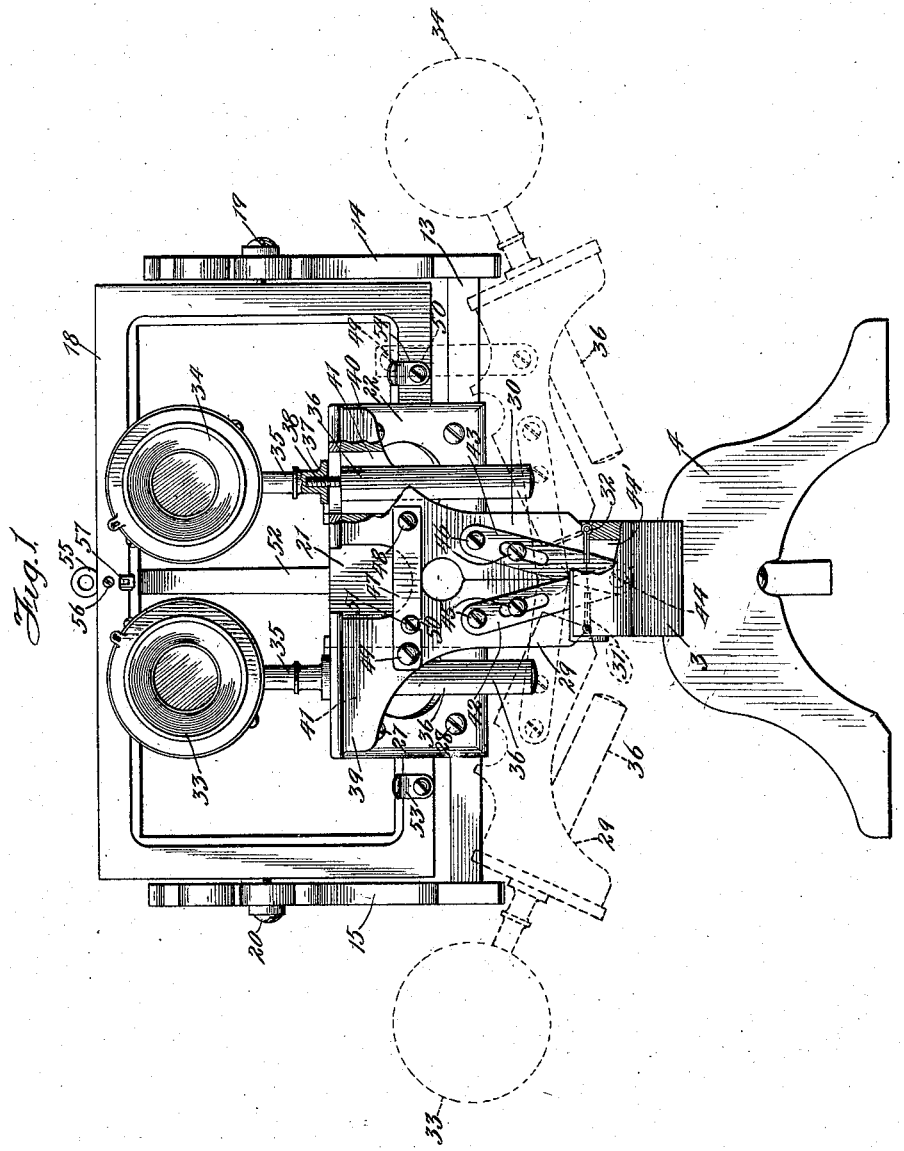

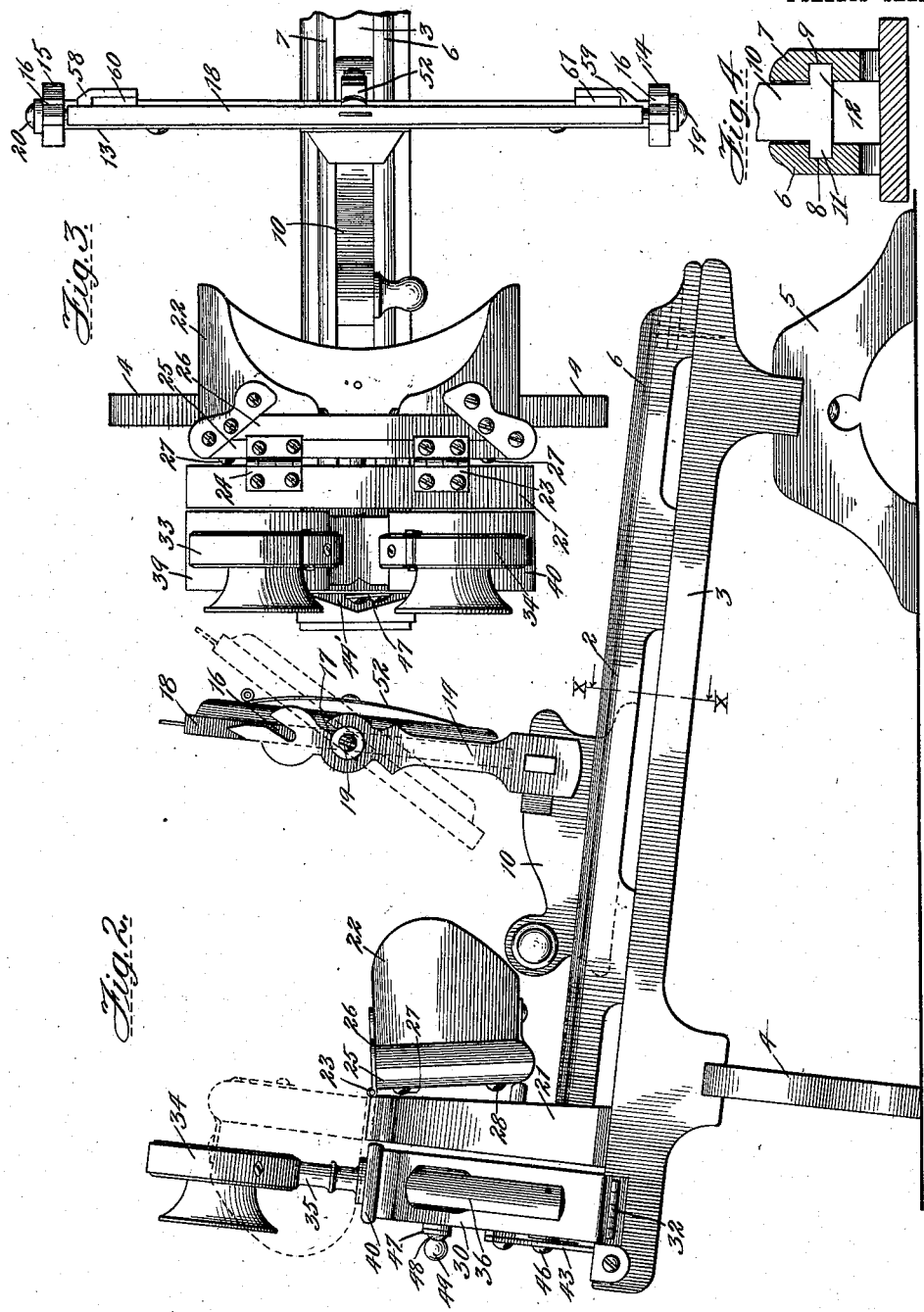

UNITED STATES PATENT OFFICE.

STEN ENGELBERT HAMMAR, OF CHICAGO, ILLINOIS.

OPTICAL INSTRUMENT.

No. 858,979.  Specification of Letters Patent.  Patented July 2, 1907.

Application filed April 25, 1907. Serial No. 370,148.

*To all whom it may concern:*

Be it known that I, STEN ENGELBERT HAMMAR, a subject of the King of Sweden, residing at Chicago, in the county of Cook and State of Illinois, have invented certain new and useful Improvements in Optical Instruments, of which the following is a specification.

My invention relates to optical instruments and has particular reference to improvements in stereoscopes and graphoscopes.

The objects of the invention are to provide added conveniences in such instruments; to increase the range of utility in a single stereoscope, and to combine a stereoscope and a graphoscope in one instrument.

With the above objects in view my invention consists in the novel construction, conveniences, arrangement and combination of parts, hereinafter described, illustrated in the drawings and incorporated in the claims.

In the drawings—Figure 1 is an end elevation of an instrument embodying my invention. Fig. 2 is a side elevation of same. Fig. 3 is a top plan view partly broken away. Fig. 4 is an enlarged section taken on line X—X of Fig. 2.

Referring in detail to the several views, the instrument is provided with a stand or support which relieves the user of the fatigue incident to holding an ordinary stereoscope in the hand, and to that end the slide-way 2 for the slide carrying the pictures is placed in a bed 3 having feet 4 and 5. The slideway 2 consists of two parallel rails 6 and 7 which have grooves 8 and 9 in their inner or adjacent faces. The slide 10 has tongues 11 and 12 which engage said grooves 8 and 9. The slide carries a rack composed of a horizontal rail 13 from the ends of which rise uprights 14 and 15. In the latter are a plurality of notches, one pair 16 and one pair 17 being shown. The frame 18 for the views is revolubly mounted upon trunnion screws 19 and 20 removably mounted in one of the pairs of notches. The frame may thus be adjusted vertically or angularly relatively to the line of sight or lenses to be referred to hereinafter.

The bed 3, as shown, is arranged to slope backwardly from the front end. On the latter is mounted at right angles to the bed and slideway, a standard 21. The well known form of hooded lens-box 22 is hinged at 23 and 24 to the top of the standard so that it may be folded back, when not in use, out of the line of vision, or out of the way of another pair of lenses to be referred to. The part of the lens-box 22 which holds the lenses is made in two halves 25 and 26 between which the lenses may be removably secure in any suitable manner to facilitate changes or renewals in the lenses. The two halves of the lens-holder are secured together by means of screws 27 and 28. The stand 21 affords opportunity for ornamentation by carving or forming it in various artistic designs.

In order to provide for another pair of lenses and at the same time retain the effect of unity in the lens supports, I provide substantially a duplicate of the standard 21 which consists of two sections 29 and 30 hinged at 31 and 32 to swing in a plane of movement at right angles to the plane in which the lens-box 22 is swung. As shown the sections 29 and 30 are hinged to the bed 3 and therefore cover the front end of the slideway 2. The standard 21 is also mounted in front of the slideway but is rigidly secured to the bed 3 in any suitable manner. The divided and movable lens-standard composed of sections 29 and 30 carries lens-holders 33 and 34 each of which comprises a stem 35 and a handle 36, the latter having a nipple 37 which has threaded engagement with a threaded bore 38 in the stem. The parts 29 and 30 have lateral shelf-like extensions 39 and 40 through which extend vertical slots 41 which permit relative adjustments of the lens-holders to vary the distance at which they are spaced apart. By unscrewing the nipples 37 the lenses 33 and 34 may be removed and used as hand instruments. The lenses in these two are revolubly mounted so that they may be adjusted to serve as a graphoscope or a stereoscope, but I claim no novelty for this well known feature, when considered by itself.

The dotted lines in Fig. 1 show the positions of the sections 29 and 30 together with the lenses thereon when moved out of the way of the lens-box 22 after the latter has been raised into operative position, shown by dotted lines in Fig. 2. The sections 29 and 30 are connected for joint angular movement by means of links 42 and 43 pivoted together at their lower ends, at 44. The link 42 is held to the part 29 by means of screws 45 and the link 43 is similarly fastened to the part 30 by screws 46. A recess 44' is made in the bed 3 to receive said pivoted ends. The sections 29 and 30 are locked together in their operative positions, or as shown in full lines, by a latch-bar 47 pivoted at 48 to the part 30. On the free end of the bar is a finger-knob 49 and a notch 50 which hooks onto a projecting screw 51 on the part 29.

On the back of the frame is a spring 52 one end of which is secured to the lower part of the frame. The opposite, or upper, end of the spring bears loosely against the upper rail of the frame 18. Between this spring and the frame views too large to fit into the regular space at the front of the frame may be held. The spring also serves, when desired, to hold a pack of views, when the front picture will be exposed to view. The latter may then be inserted between the spring and the back of the pack to expose the next picture, and so on without removing the supply of pictures from the frame or instrument. The frame is designed to fit the ordinary views and to hold them at the front rather than the back. For this purpose clips 53 and 54 are secured to the lower rail of the frame and a longitudinally movable catch or clip is placed in the middle of the upper rail. Between these clips and the inner margin of the front of the frame the pictures of ordinary sized cards are held. The clip 55 is held in a slot passing through the upper rail of the frame and has a slot 57 which is engaged by a screw 56. After the lower edge of a card or view has been placed behind the lower clips the upper clip may be raised to permit the upper edge of the card to pass back of it after which it is pushed down in front of the upper edge of the card.

Cards may be held singly at the back of the frame, when they are a trifle too large to be held at the front, and for this purpose I place ribs or stops on the backs of the vertical bars of the frame against which the ends of a card are supported. The lower edge of the cord, or rather the lower corners, are supported in horizontal recesses 59 and 60 in lower horizontal portions of the ribs 58 and 59 referred to.

When the instrument is placed upon a table and the person using it is sitting down the backward slope of the bed and slideway will bring the picture on the frame conveniently in line with the user's eyes when applied to the lenses, and as the instrument is properly self supported the trouble and awkwardness of holding the instrument and adjusting the views with one hand is obviated.

The angularly movable lenses may be adapted or adjustable for graphoscope purposes, or used in viewing single pictures, such as picture postal cards and the like, while the lens-box 22 may be used for regular stereoscopic or double pictures. Single and double pictures may be inspected alternately with little trouble by merely pushing apart the lenses 33 and 34 and raising into position the lens box 22, or reversing the operation, as the case may be. As stated in the foregoing the frame holding the pictures is adjustable up or down and on its pivots for the purpose of placing the pictures in correct positions relatively to the lenses. Oftentimes the condition of light is such that tilting the picture slightly one way or the other will make it clear to the user's eyes. The lenses in the box 22 are fixed semi lenses, while the other pair of lenses are revolubly mounted semi lenses so that they can be used for either double or single pictures.

Having described my invention, I claim as new and desire to secure by Letters Patent—

1. The combination with a view-holder and means for supporting and adjusting same, of two pairs of lenses adapted for different purposes, both said pairs of lenses normally occupying the same line of vision relative to said view-holder, and means for moving or swinging either pair of lenses out of the line of vision of the other pair.

2. In a single instrument, the combination with a suitable support, of an adjustable view-holder, a plurality of pairs of lenses, each pair being, in turn, movable into operative relation relative to said view holder and the remaining lenses being movable out of the way of the operative pair.

3. The combination with a support, of a view-holder slidably mounted thereon, means for adjusting views on said view-holder at right angles to the sliding path of said view-holder, a plurality of pairs of lenses normally occupying an operative position relative to said view-holder, and means for shifting said lenses out of their position, for the purpose set forth.

4. The combination with a stand, of a slideway mounted at an angle of inclination relative to said stand, a view-frame slidably mounted on said slide-way, means at the upper end of said slideway for supporting a plurality of pairs of lenses in operative positions relative to said frame, and means for temporarily swinging either pair of lenses out of the way of the other lenses.

5. The combination of a pair of graphoscope lenses with a pair of stereoscope lenses, of means common to all said lenses for supporting and adjusting views relatively to said lenses, said graphoscope lenses being adjustable in directions at right angles to each other and said means for supporting views providing for adjustment of the views in directions at right angles to each other, as and for the purpose specified.

In testimony whereof I have hereunto set my hand in the presence of two subscribing witnesses.

STEN ENGELBERT HAMMAR.

Witnesses:
    F. O. FARSLUND,
    P. K. MOLUF.